United States Patent

[11] 3,634,128

[72] Inventor Harold R. Bolin
 Logan, Utah
[21] Appl. No. 859,053
[22] Filed Sept. 18, 1969
[45] Patented Jan. 11, 1972
[73] Assignee The United States of America as represented by the Secretary of Agriculture

[54] PROCESS FOR CONCENTRATING LIQUID FOODS
 3 Claims, 2 Drawing Figs.
[52] U.S. Cl. .................................................. 99/205,
 99/199, 99/246, 210/23, 210/321, 202/236
[51] Int. Cl. .................................................. A23b 7/02,
 B01d 13/00
[50] Field of Search ................................. 210/22, 23,
 321; 99/199, 205, 246, 206; 202/236

[56] References Cited
 UNITED STATES PATENTS
2,386,826 10/1945 Wallach et al. ............... 99/199

| | | | |
|---|---|---|---|
| 3,228,876 | 1/1966 | Mahon ........................ | 210/22 |
| 3,228,877 | 1/1966 | Mahon ........................ | 210/22 |
| 2,411,238 | 11/1946 | Zender ........................ | 210/22 |
| 3,367,787 | 2/1968 | Thijssen et al. ............... | 210/22 |

Primary Examiner—Norman Yudkoff
Assistant Examiner—Curtis P. Ribando
Attorneys—R. Hoffman, W. Bier and W. Takacs ABSTRACT: I. A juice which contains undissolved material is subjected to a separation treatment, e.g., screening, filtration, or centrifugation. II. The resulting clarified juice is applied to one side of a membrane while heated air is applied to the other side thereof to evaporate water which diffuses through the membrane. Concomitantly cooling is applied to the juice to prevent damage thereof. III. The concentrated juice formed in the diffusion process is then blended with the undissolved material separated from the original juice in step I.

HAROLD R. BOLIN
INVENTOR

BY R. Hoffman & W. Takacs
ATTORNEYS

PROCESS FOR CONCENTRATING LIQUID FOODS

A nonexclusive, irrevocable, royalty-free license in the invention herein described, throughout the world for all purposes of the Government, with the power to grant sublicenses for such purposes, is hereby granted to the Government of the United States of America.

This invention relates to and has among its objects the provision of novel processes for concentrating liquid foods, e.g., fruit juices. Further objects of the invention will be evident from the following description wherein parts and percentages are by weight unless otherwise specified.

Figure 2:
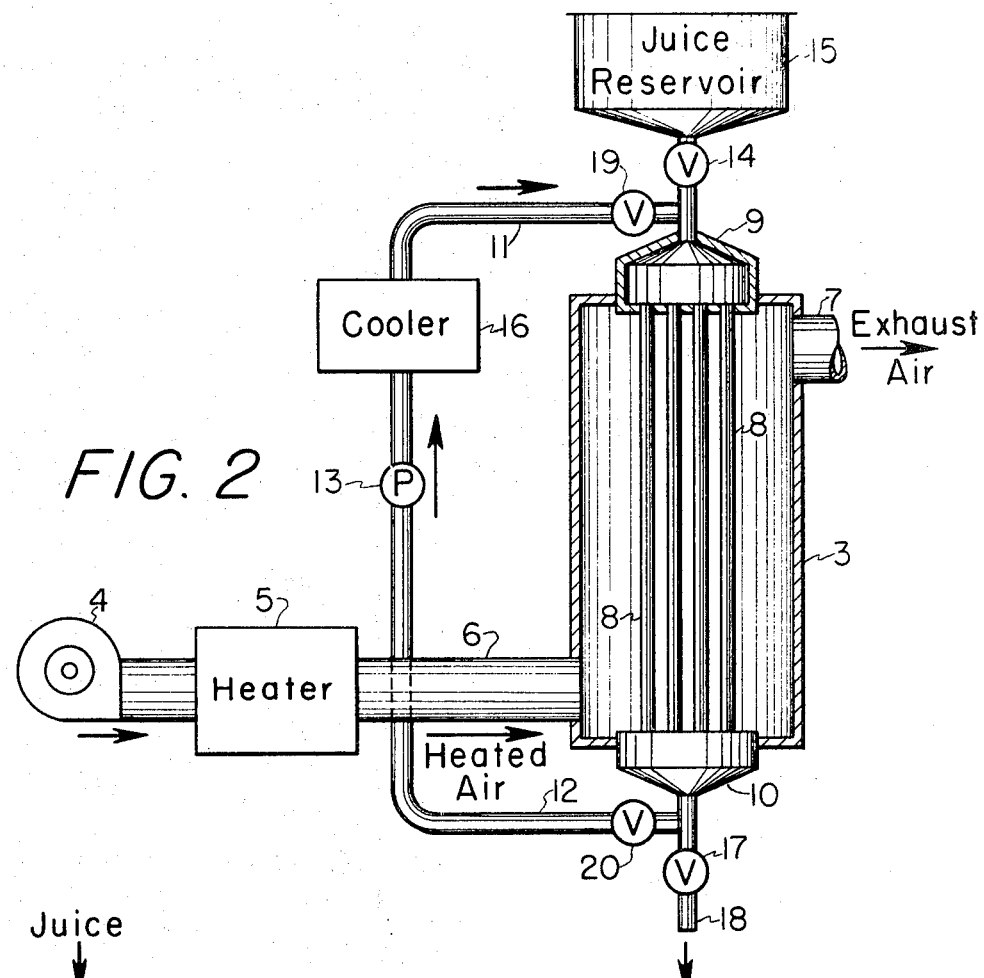
Figure 1:
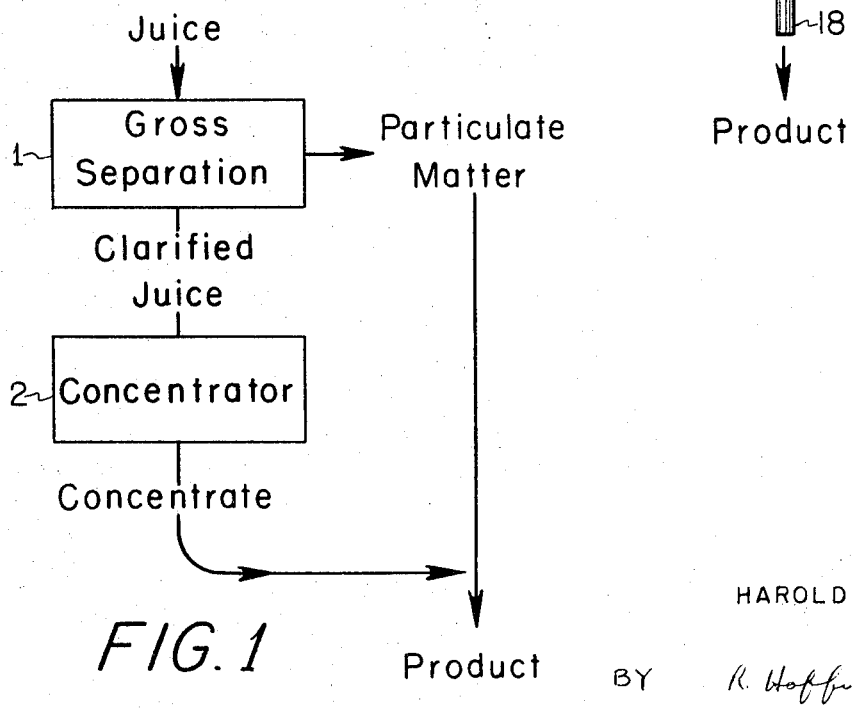

In the annexed drawing, FIG. 1 is a flowsheet illustrating a procedure in accordance with the invention. FIG. 2 is a schematic diagram of apparatus which may be used in applying the invention In conventional practice, concentrates of fruit juices and other liquid foods are prepared by evaporative techniques, that is, by boiling the starting liquid to vaporize water therefrom. Although such procedures are widely used they suffer from the disadvantage that deleterious changes in flavor and other valuable characteristics occur. For example, flavor components are lost by evaporation with the vaporized water. Also, the application of heat causes alterations in the flavor components of the material under treatment, through such mechanisms as oxidation, decomposition of thermally sensitive flavor principles, reactions of sugar with amino acids or other nitrogenous components, hydrolysis of esters and lactones, etc. Moreover, these reactions lead to such deleterious results as undesired color changes, for example, those caused by browning reactions whereby the bright native of the food is rendered dull and muddy, and loss of nutrients as by the decomposition of heat-labile vitamins such as Vitamins A and C. It is appreciated that these undesired results can be mitigated, at least in part, by boiling the juice under vacuum. This, however, gives rise to other problems. For example, operation under vacuum requires the use of complex equipment which is expensive not only as to initial, but also as to operating costs. Moreover, where the evaporation is conducted under vacuum, flavor principles are lost by evaporation with water. In other words, this deleterious effect of conventional evaporation is not mitigated by operation under vacuum; in fact, the loss of flavor may even be increased.

A primary object of the invention is the provision of novel processes which obviate the problems outlined above.

In accordance with the invention, fruit juices or other liquid foods are concentrated by a procedure which avoids direct application of heat and evaporation to the liquid. An indirect approach is employed which involves evaporation of water after it has been separated from the liquid under treatment. Basically, the process of the invention involves the following operations: The liquid food is applied to one side of a suitable membrane. Concomitantly, a stream of warm air is applied to the opposite side of the membrane. Water (from the liquid food) diffuses through the membrane and on arriving at the opposite side is evaporated and carried away by the stream of warm air. As a net result, a residue of concentrated liquid remains on the upstream side of the membrane.

A primary advantage of the invention is that evaporation is not applied directly to the liquid under treatment. As a result the original content of volatile flavoring principles is retained in the product. Moreover, since heat is not directly applied to the liquid, the original flavor, color, and nutrient values of the liquid are preserved. Another significant advantage of the invention is that it does not require vacuum pumps, or any other equipment for producing or retaining subatmospheric pressures.

It is recognized that it is known to concentrate juices by reverse osmosis. In this procedure, the juice is applied under high pressure against a membrane whereby water (from the juice) passes through the membrane and is removed as liquid water. The concentrated juice is collected from the upstream side of the membrane. In order to achieve the desired reverse osmotic effect it is essential to employ very high pressures; the juice must be applied at a pressure high enough to overcome the osmotic pressure of the juice. For example, with a juice containing 10 percent solids the minimum pressure which will cause reverse osmosis is about 200 p.s.i. Actually, pressures much higher than this—for example, 500 to 2,000 p.s.i.—are used to achieve a useful rate of concentration. Moreover, as the juice becomes concentrated the osmotic pressure increases so that a progressively higher pressure must be applied to maintain the flow in the desired (reverse) direction. Because of the need for high pressures, reverse osmosis systems require heavy and elaborate equipment. The membranes must be supported by special high-strength members which can withstand the applied pressure yet permit passage of water. Another problem is that food products may be altered in their properties by shear forces applied thereto as they are fed into the high-pressure reverse osmosis system or as the concentrated product is discharged therefrom. A typical example in this regard is egg white which undergoes impairment of its aeration properties when subjected to high shear stresses.

The system of the invention avoids the disadvantages outlined above. High pressures are not used; instead, one uses moderate pressures, i.e., those which are below the osmotic pressure of the juice with respect to water. Ordinarily, I use pressures which are but a small fraction of the osmotic pressure. Thus, for example, the only pressure exerted on the juice under treatment may be that due to the hydrostatic head of juice in a vertically disposed tubular membrane having a height on the order of 1 to 5 feet, corresponding to a pressure of about 0.5 to 2 p.s.i.g. Because the system of the invention involves the use of moderate pressures—i.e., those incapable of effectuating reverse osmosis—the apparatus is of simple and inexpensive construction, and no supports need be provided for the membrane—their inherent strength is capable of resisting the applied pressure. Also, in the process of the invention no significant shear stresses are applied to the material under treatment so that the original properties of the material are preserved.

The process of the invention is of wide applicability and can be utilized for the concentration of liquid foods of all kinds. Typical liquids which may be concentrated in accordance with the invention are listed below solely by way of example and not limitation.

Fruit and Vegetable Products: Extracts, pulps, purees, and similar liquid products derived from fruits or vegetables such as orange, grapefruit, lemon, lime, apple, pear, apricot, strawberry, raspberry, cranberry, pineapple, grape, prune, plum, peach, cherry, tomato, celery, carrot, spinach, onion, lettuce, cabbage, potato, sweet potato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sun-drying, sulphiting, or preservation by application of chemical preservatives or ionizing radiations.

Meat and Fish Products: Meat extracts, meat juices, soups or broths made from meat or fish products with or without added vegetative material, clam juice, oyster stew, fish or clam chowders, etc.

Lacteal Products: Whole milk, skim milk, whey, cream, buttermilk, yogurt, milk products containing such additives as chocolate, cocoa, sugar, malt, vitamins, sugar, etc.

Cereal Products: Aqueous extracts of cereals such as wheat, barley, malted barley, rice, corn, etc.

Beverages: Aqueous extracts of coffee, tea, chocolate, yerba mate, roasted cereal products (simulated coffee products), etc.

Carbohydrate Substances: Honey, maple syrup, corn syrup, sorghum syrup, molasses, etc.

Egg Products: Egg white, egg yolk, whole egg, or preparations of egg with other foods such as milk, cream, sugar flavorings, etc.

Miscellaneous: Juices, extracts, purees and other liquid products made from alfalfa, clover, grasses, cottonseed or soy bean meals, sugar cane, sugar beet, sorghum, animal blood, etc. Vitamin preparations such as solutions of ascorbic acid, thiamin or other vitamins, vitamin concentrates or precursors, fermentation products such as beers (culture liquors) containing mushroom mycelium, yeasts, biosynthesized vitamins, etc.

It is obvious that the conditions applied during the operation of the invention—for example, the time of exposure of the liquid to the membrane, the area of membrane provided, the type of membrane, the pressure applied to the liquid, etc.— may be varied to attain a concentrate of the desired solids content. If a concentrate of relatively high solids content is desired as the end product the conditions are adjusted (for example, the exposure time and/or the area of membrane are increased) to achieve a high degree of dewatering. Conversely, if a product of relatively low solids content is desired the conditions are selected to attain a lesser degree of dewatering (for example, the exposure time and/or membrane area are decreased). By way of example but not limitation, when fruit juices are subjected to the process of the invention they may be concentrated to a level of about 40 to 60 percent solids to yield products to be preserved by freezing, canning, or other conventional treatment, or they may be concentrated to higher levels of solids content, say 75 to 85 percent, to attain self-preserving concentrates. It is evident from the above that selection of the degree of concentration is not a critical factor but simply depends on the operator.

The liquid food to which the process of the invention is applied need not necessarily be a true solution but may contain suspended matter in addition to dissolved matter. The invention is thus generically applicable to the concentration of any food in a liquid state, the term "liquid" being used in the sense of including any physical form which is capable of flowing. Generally, when the starting material contains undissolved matter, for example, cellular fragments or other fibrous material, pectin, oils or the like, it is preferred to temporarily remove this material to avoid possibility of clogging the equipment. A procedure utilizing this principle is illustrated in FIG. 1. Referring to this figure, the liquid food containing undissolved material, for example, tomato juice which contains pulp (undissolved fibrous particles, pigments, pectin, etc.) is first subjected to a gross separation, represented by block 1, to remove the pulp. This gross separation may take the form of screening, filtration, centrifugation, or other known unit process effective for such purposes. The resulting clarified juice is then subjected to concentration represented by block 2, to yield concentrated clarified juice. The latter is then blended back with the pulp to form the product—a concentrated juice containing pulp as customary with this type of food.

The concentration in accordance with the invention is carried out in apparatus which may take various forms. Basically, the apparatus will include a membrane, means for applying the liquid against the membrane, and means for applying a current of heated air to the reverse side of the membrane. As the membrane one may use any of the known films which display semipermeable properties, and particularly those which have a high water/solute diffusivity ratio, in other words, those which exhibit a high permeability to water but a low permeability to solutes. Thereby water can flow through the membrane whereas passage of solutes—e.g., dissolved salts; sugars; citric, malic, and other fruit acids; and other nutrient, flavor, and color components as may be present in the liquid under treatment—is prevented or at least impeded to a large degree. Various membranes which exhibit these properties are known in the art and described in the literature, for example: Lowe and Durkee, U.S. Pat. No. 3,341,024; Reid and Breton, Jour. of Applied Polymer Science, Vol. I, pp. 133–143; U.S. Pat. Nos. 3,133,132 and 3,133,137; and Morgan et al., Food Technology, Vol. 19, pp. 52–54. Useful, for example, are membranes of regenerated cellulose (cellophane), cellulose nitrate, cellulose acetate, perchlorate-modified cellulose acetate, etc.

Preferably the apparatus should include some means to stir, circulate, or otherwise affect the liquid under treatment to prevent formation of localized areas of high solute concentration (which could be conductive to inadequate dewatering) or localized areas of low solute concentration (which would lead to inefficient utilization of the membrane diffusion capacity). In a preferred system, the membrane takes a tubular form with a high ratio of length to diameter. In operation the liquid is circulated through the tubular membrane until it reaches the desired solids content. This system has the advantage that the flow of liquid through the tube causes an optimum scavenging effect whereby the permeability of creating localized high or low concentrations of solute is avoided. Moreover with this system, any undissolved material, either originally present or formed during the dewatering, is swept through the system so that the process can be run for prolonged periods without fouling. Apparatus which embodies these principles is shown in FIG. 2 of the annexed drawing.

Referring to FIG. 2, the apparatus includes a chamber 3. In operation, a current of heated air is continuously blown through this chamber by blower 4. This blower takes in atmospheric air, forces it through heater 5 where its temperature is raised to the operating level (for example, about 90° to 165° F.), and impels the heated air through duct 6, chamber 3, and out of the system via vent 7.

Vertically disposed within chamber 3 are tubular membranes 8, fastened at their upper ends to header 9 and at their lower ends to header 10. Equipment communicating with headers 9 and 10 is provided for circulating the liquid to be treated through tubular membranes 8. This equipment includes pipes 11 and 12, and circulating pump 13.

When the apparatus is to be started up, valve 14 is opened to allow juice from reservoir 15 to fill the liquid circulation system. Valve 14 is then closed and pump 13 is operated continuously during the run to circulate the juice about the loop represented by pipe 11, header 9, tubular membranes 8, header 10, and pipe 12. It may be observed that the liquid in the system is pressurized to at most a small extent as dictated by the column of liquid in tubular membranes 8. The portion of liquid at the top of the tubular membranes will be at atmospheric pressure, and the portion of the liquid at the base of the columns will be at a pressure dependent on the height of membranes 8. In typical cases, the maximum pressure will be on the order of 0.5 to 10 p.s.i.g.

A cooler 16 is included in the aforesaid loop, and may be operated from time to time as necessary to maintain the liquid at a temperature below that which would be detrimental to it. Thus, if the liquid becomes heated in its passage through tubes 8, cooler 16 will reduce its temperature to a desired level. Usually, it is preferred to maintain the liquid at ambient temperatures or below, for example, from 50° to 85° F. In many cases, little or no cooling need be applied as the liquid is maintained at the desired temperature level by the cooling effect taking place as water is evaporated on the outer surfaces of tubular membranes 8.

During passage of the juice through tubes 8, water contained in the juice will diffuse through the walls of these tubes. The water so diffusing is then evaporated and carried out of the system by the current of heated air moving through chamber 3 and contacting the outer surfaces of tubes 8. Circulation of the juice is continued until it reaches a selected solids content and the concentrated juice is then drawn out of the system via valve 17 and pipe 18.

In an alternative procedure, the juice in the system is circulated as above described while fresh juice is continuously metered into the system via valve 14 at a predetermined rate, and concentrate is continuously metered out of the system via valve 17 at a predetermined rate which provides a concentrate of desired solids content.

Another alternative plan of operation involves the following: Valves 19 and 20 are closed to shut off the circulation loop. Juice to be concentrated is continuously fed into tubes 8 via valve 14 at a predetermined rate, and concentrate is continuously metered out of the system via valve 17 at a rate which yields a concentrate of desired solids content. Warm air is, of course, blown through chamber 3 as previously described to attain the desired evaporation of the diffused water.

EXAMPLES

The invention is further demonstrated by the following illustrative examples:

EXAMPLE 1

Apple juice (11.5° Brix) was filled into tubular cellophane membranes having a diameter of 1⅛ inches and a length of 10 inches. The tubes were sealed and suspended vertically in a conventional dehydrator where they were exposed to a draft of air heated to 100° F. After 10 hours, the run was discontinued and the concentrate remaining in the tubes was collected. It was found to have a density of 42° Brix. A sample of the concentrate was reconstituted by addition of water and submitted to a panel of skilled food tasters, along with a sample of the original juice. The panel found that the reconstituted concentrate has an excellent taste, and no flavor difference from the control could be detected.

EXAMPLE 2

In this experiment, there was used an apparatus as shown in FIG. 2, except that it did not have the circulation loop. Tubular membranes 8 were of cellophane, three-fourths inch in diameter and 40 inches long. The process was conducted on a continuous bases by first filling tubes 8 with apple juice (12° Brix) and then continuously adding this juice at the rate of 180 ml. per hour. Temperature of the hot air entering chamber 3 was 150° F. The concentrated product was continuously withdrawn from the base of the system at the rate of 60 ml. per hour. Density of the concentrated product was 38° Brix.

Having thus described the invention, I claim:

1. A process for concentrating a juice which contains undissolved material, which comprises
    a. subjecting the juice to a separation treatment to remove the undissolved material therefrom,
    b. applying the resulting clarified juice to one side of a membrane to cause water from the juice to diffuse through the membrane, while applying cooling to the said juice in a recycle circuit to maintain it at a temperature of about 50° to 85° F.,
    c. concomitantly applying a gas heated to about 90° to 165° F. to the other side of the membrane to evaporate the water diffusing through the membrane,
    d. continuing said application of the juice and heated gas for a period long enough to achieve a substantial concentration of the juice,
    e. collecting the resulting concentrated juice, and
    f. mixing it with the undissolved material removed from the original juice in step a.

2. The process of claim 1 wherein the juice is tomato juice which contains a pulp of undissolved fibrous particles, pigments, and pectin.

3. Apparatus for concentrating juices comprising, in combination
    a. a first header,
    b. a second header disposed beneath the first header,
    c. a plurality of tubular membranes mounted vertically between said headers and supported solely at their tops and bottoms by said headers,
    d. an enclosure about the tubular membranes but spaced therefrom,
    e. means for impelling a current of gas heated to 90° to 165° F., through the enclosure and against the outer surfaces of the tubular membranes,
    f. means for feeding a juice into the first header for passage through the tubular membranes,
    g. means for withdrawing concentrated juice from the second header, and
    h. a circulation loop communicating with the first and second header, the loop including a circulating pump and a cooler for maintaining the juice at a predetermined temperature of 50° to 85° F.

* * * * *